United States Patent
Walma et al.

(10) Patent No.: US 10,216,922 B1
(45) Date of Patent: Feb. 26, 2019

(54) WIRELESS NETWORK OF LIGHTING DEVICES

(71) Applicant: Cooper Technologies Company, Houston, TX (US)

(72) Inventors: Kenneth Dale Walma, Peachtree City, GA (US); James Moan, Peachtree City, GA (US)

(73) Assignee: Cooper Technologies Company, Houston, TX (US)

(*) Notice: Subject to any disclaimer, the term of this patent is extended or adjusted under 35 U.S.C. 154(b) by 221 days.

(21) Appl. No.: 15/371,522

(22) Filed: Dec. 7, 2016

Related U.S. Application Data

(60) Provisional application No. 62/264,139, filed on Dec. 7, 2015.

(51) Int. Cl.
| | | |
|---|---|---|
| *G06F 21/00* | (2013.01) | |
| *G06F 21/45* | (2013.01) | |
| *H04L 29/06* | (2006.01) | |
| *H04W 12/06* | (2009.01) | |
| *H04W 84/18* | (2009.01) | |

(52) U.S. Cl.
CPC ........... *G06F 21/45* (2013.01); *H04L 63/083* (2013.01); *H04L 63/0853* (2013.01); *H04W 12/06* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,468,078 | B1 * | 10/2016 | White | H05B 37/0272 |
| 9,609,725 | B2 * | 3/2017 | Bosua | H05B 33/0857 |
| 2016/0092704 | A1 * | 3/2016 | Russell | F21V 23/0471 |
| | | | | 340/10.3 |

* cited by examiner

*Primary Examiner* — Eleni A Shiferaw
*Assistant Examiner* — Andrew J Steinle
(74) *Attorney, Agent, or Firm* — King & Spalding LLP

(57) ABSTRACT

A system for changing a network password includes a first lighting device to wirelessly connect to a second lighting device on a first wireless network having a first network identification. The first network identification is a network password of the first wireless device. The system further includes a password recovery device, wherein, in response to detecting a power cycling sequence of power provided to the first lighting device, the first lighting device is to attempt to wirelessly connect to the password recovery device over a recovery wireless network having a recovery network identification before attempting to connect to the second lighting device over the first wireless network. The recovery network identification is a network password of the recovery wireless network. The password recovery device includes a software user interface for changing the first network identification stored in the first lighting device.

20 Claims, 3 Drawing Sheets

WIRELESS NETWORK OF LIGHTING DEVICES

RELATED APPLICATIONS

The present application claims priority under 35 U.S.C. § 119(e) to U.S. Provisional Patent Application No. 62/264,139, filed Dec. 7, 2015, and titled "Wireless Network Of Lighting Devices," the entire content of which is incorporated herein by reference.

TECHNICAL FIELD

The present disclosure generally relates to a wireless network of lighting devices, in particular to accessing the wireless network of lighting devices.

BACKGROUND

Lighting devices may be wirelessly connected to each other using a wireless network. For example, dimmers and switches may be wirelessly connected to a number of lighting fixtures. As another example, a centralized lighting control device may wirelessly communicate with a number of other lighting devices to control/adjust operations of the lighting devices. In some situations, the lighting devices do not have a wired front end that allows a person to connect to the devices by another device and to change or reset the network password using a software interface.

Wirelessly connected password protected distributed wireless lighting devices that do not have an enterprise front end or infrastructure for changing the network password rely on other methods of recovery if the network password is unknown or misplaced. These methods typically require pushing a button on the device, erasing a memory of the device, wiring directly to the device, or a generic password that sacrifices security. In some applications, these methods may not be ideal for devices that are not easily accessible or that are sensitive to security issues.

Thus, the capability to change a password of a wireless network of lighting devices that lacks an enterprise front end or infrastructure with ease and without sacrificing security is desirable.

SUMMARY

The present disclosure generally relates to a wireless network of lighting devices, in particular to accessing the wireless network of lighting devices. In an example embodiment, a system for changing a network password includes a first lighting device to wirelessly connect to a second lighting device on a first wireless network having a first network identification. The first network identification is a network password of the first wireless device. The system further includes a password recovery device, wherein, in response to detecting a power cycling sequence of power provided to the first lighting device, the first lighting device is to attempt to wirelessly connect to the password recovery device over a recovery wireless network having a recovery network identification before attempting to connect to the second lighting device over the first wireless network. The recovery network identification is a network password of the recovery wireless network. The password recovery device includes a software user interface for changing the first network identification stored in the first lighting device.

In another example embodiment, a method for changing a network password includes detecting, by a first lighting device, a power cycling sequence of power provided to the first lighting device. A first network identification is stored in the first lighting device. The first network identification is a network password of a first wireless network. The first lighting device is to wirelessly connect to a second lighting device over the first wireless network. The method further includes connecting wirelessly, by the first lighting device, to a password recovery device over a password recovery network having a recovery network identification after detecting the power cycling sequence by the first lighting device. The recovery network identification is a network password of the recovery wireless network. The method also includes changing the first network identification stored in the first lighting device using a software user interface of the password recovery device after the first lighting device connects wirelessly with the password recovery device over the password recovery network.

In another example embodiment, a method for changing a network password includes introducing a password recovery device. The password recovery device wirelessly transmits a signal over a recovery wireless network indicating a presence of the password recovery device. The method further includes power cycling a first lighting device in a power cycling sequence. A default network identification is stored in the first lighting device. The default network identification is a network password of a default wireless network. The first lighting device is to wirelessly connect to a second lighting device over the default wireless network. The method also includes connecting wirelessly, by the first lighting device, to the password recovery device over the password recovery network in response to detecting the password recovery device. The method further includes changing the default network identification stored in the first lighting device using a software user interface of the password recovery device after the first lighting device connects wirelessly with the password recovery device over the password recovery network.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
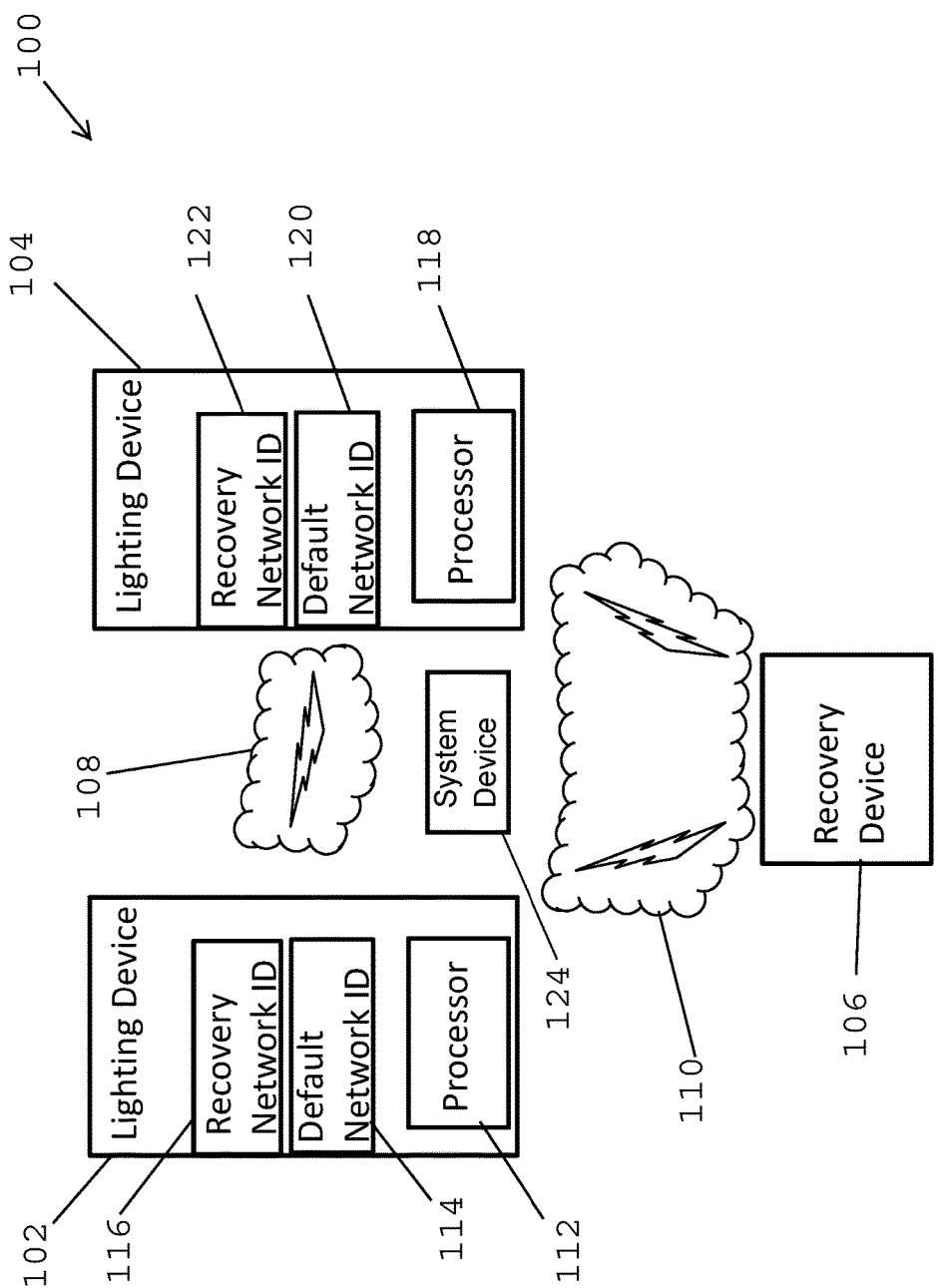
FIG. 1 illustrates a system for changing a password of a wireless network of lighting devices according to an example embodiment.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. In the drawings, reference numerals designate like or corresponding, but not necessarily identical, elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a system 100 for changing a password of a wireless network of lighting devices according to an example embodiment. The system 100 includes a first lighting device 102 and a second lighting device 104. The system 100 also includes a password recovery device 106. In some example embodiments, the lighting device 102 includes a processor 112, a storage 114 that stores a default network identification, and a storage 116 that stores a recovery network identification. In some example embodiments, the lighting device 104 includes a processor 118, a storage 120 that stores the default network identification, and a storage 122 that stores the recovery network identification.

In some example embodiments, the storages 114, 116, 120, 122 may each be a memory device such as an SRAM. Alternatively, the storages 114, 116 may be in a single memory device in the lighting device 104, and the storages 120, 122 may be in a single memory device in the lighting device 104. In some alternative embodiments, the storages 116 and 120 may be hardwired with the value of the default network identification.

In some example embodiments, the lighting devices 102, 104 are connected to a default wireless network 108. That is, the lighting device 102 can communicate with the lighting device 104 over the default wireless network 108. The default wireless network 108 may be a password protected network such that a network password (e.g., the default network identification) is required to join the default wireless network 108. To illustrate, wireless devices must know the network password to communicate with the lighting devices 102, 104, and other wireless devices over the default wireless network 108. The default wireless network 108 may be an ad hoc network that allows peer-to-peer communication between the first lighting device 102 and the second lighting device 104 as well as other wireless devices that have the network password of the wireless network 108. Alternatively or in addition, the default wireless network 108 may include a network device that operates as a wireless network router, and wireless devices including the lighting devices 102, 104 may communicate with each other over the default wireless network 108 through the wireless network router.

In some example embodiments, the default wireless network 108 may operate according to a proprietary protocol. For example, the default wireless network 108 may operate based on a protocol tailored for communication among lighting devices. To illustrate, in some example embodiments, the lighting device 102 may be a lighting control device such as a switch, a dimmer, a timer, or a centralized lighting control device that controls operations of different types of lighting devices. For example, the lighting device 102 may be a dimmer, and the lighting device 104 may be a lighting fixture that is wirelessly controlled by the lighting device 102 over the default wireless network 108. As another example, the lighting device 102 and the lighting device 104 may be lighting fixtures that are wirelessly controlled by another lighting device over the default wireless network 108.

In some example embodiments, at power up of the lighting device 102, the lighting device 102 may search for devices that are on the default wireless network 108. Similarly, at power up of the lighting device 104, the lighting device 104 may search for devices that are on the default wireless network 108. For example, at power up of the lighting device 102, the lighting device 102 may pair up or otherwise establish communication with the lighting device 104 after searching and finding the lighting device 104 on the default wireless network 108.

In some example embodiments, a user may want to configure one or more of the lighting devices 102, 104 and other devices that are on the default wireless network 108. For example, a user may want to wirelessly configure a color temperature of the light emitted by the lighting device 104 by communicating with the lighting device 104 over the default wireless network 108. To illustrate, to change desired parameters or settings of the devices 102, 104, a user may use a wireless system device 124 that has the appropriate software/application. To wirelessly communicate with the lighting devices 102, 104, and/or other devices over the default wireless network 108 and configure the devices, the system device 124 also needs to have the network password of the default wireless network 108. If the system device 124 does not have the network password of the default wireless network 108 and the user cannot obtain the network password, the user may need to change the network password. For example, the user may introduce the password recovery device 106 into the system 100 to set/change the network password of the default wireless network 108.

In some example embodiments, the password recovery device 106 may communicate with the lighting device 102 and/or the lighting device 104 using a recovery wireless network 110. The password recovery device 106 uses the recovery network identification of the recovery wireless network 110 to communicate with the lighting devices 102, 104. As described above, the lighting device 102 includes the storage 116 that stores the recovery network identification of the recovery wireless network 110, and the lighting device 104 includes the storage 122 that stores the recovery network identification. By using the recovery network identification to communicate with the lighting devices 102, 104, and other lighting devices over the recovery wireless network 110, the user may change the default network identification stored in the lighting devices 102, 104, and other lighting devices. To illustrate, the user may change the default network identification stored in the storages 114, 120. Because the network password of the default wireless network 108 is now known to the user after the change, the system device 124 may communicate with the lighting devices 102, 104, and other lighting devices using the wireless network 108.

In some example embodiments, before the user can change the network password of the default wireless network 108 (i.e., the default network identification of the lighting devices 102, 104, and other wireless devices on the default wireless network 108), the lighting device 102 and the lighting device 104 as well as other lighting devices in the system 100 need to establish communication with the password recovery device 106. For example, the lighting device 102, 104 may need to operate in a particular manner to initiate communication with the password recovery device 106.

To illustrate with respect to the lighting device 102, a user may power cycle the lighting device 102 in a particular sequence that is detectable by the lighting device 102 to indicate to the lighting device 102 to look for the password recovery device 106 on the recovery wireless network 110. For example, the processor 112 of the lighting device 102 may detect the power cycle sequence. As a non-limiting example of a power sequence, the user may power cycle the lighting device 102 three times such that, at the end of the third power cycle, power is provided to the lighting device 102. That is, the user may turn off and turn back on the power to the lighting device 102 in three quick successions, and the lighting device 102 may identify such sequence as an indication to look for the password recovery device 106 on the recovery wireless network 110.

For example, the lighting device 102 may have enough stored power (e.g., in a capacitor) to record the powering off events to be able to determine whether the particular power cycle sequence occurred. Alternatively, the lighting device 102 may include a battery to perform some operations, including recording powering off events. The lighting device 102 may determine whether the expected power cycling sequence has occurred based on the number of recorded powering off events. In some example embodiments, all lighting devices, including the lighting devices 102, 104, that can communicate to the default wireless network 108 may be power cycled, for example, using a breaker that controls power to all the lighting devices. The particular power cycle sequence may be hardwired or stored in each of the lighting devices.

If the lighting device 102 detects the expected power cycle sequence, it may start searching for the password recovery device 106 on the recovery wireless network 110 instead of connecting to the default wireless network 108 and communicating to other lighting devices over the default wireless network 108. After detecting the expected power cycle sequence, the lighting device 102 may use the recovery network identification of the recovery wireless network 110 stored in the storage 116 of the lighting device 102 to search for the password recovery device 106 on the recovery wireless network 110. For example, the password recovery device 106 may transmit a signal (e.g., a beacon) indicating its presence on the recovery wireless network 110, and the lighting device 102 may detect the signal and start communication with the password recovery device 106.

Alternatively, the lighting device 102 may find the password recovery device 106 by other means known to those of ordinary skill in the art with the benefit of this disclosure. In general, the lighting device 102 and the password recovery device 106 may find each other on the recovery wireless network 110 in one of several ways known to those of ordinary skill in the art with the benefit of this disclosure. The other lighting devices including the lighting device 104 may search and find the password recovery device 106 on the recovery wireless network 110 in a similar manner as described with respect to the lighting device 102.

After the lighting device 102 finds the password recovery device 106 on the recovery wireless network 110, the lighting device 102 can connect to the password recovery device 106. In general, the lighting device 102 and the password recovery device 106 may establish a wireless connection with each other on the recovery wireless network 110 in one of several ways known to those of ordinary skill in the art with the benefit of this disclosure. The recovery wireless network 110 may be based on a proprietary wireless communication protocol or an industry standard wireless communication protocol.

After the lighting device 102 is connected to the password recovery device 106, a user may use a software interface of the password recovery device 106 to change or reset the network password of the default wireless network 108. For example, a software resident on the password recovery device 106 may provide a user interface that allows the user to set, change, or reset the default network identification stored in the storage 114 of the lighting device 102. The user may similarly set, change, and reset the default network identification stored in the other lighting devices including the lighting device 104, effectively changing the network password of the default wireless network 108.

In some example embodiments, the password recovery device 106 may serve as a network access point for devices that connect to it over the recovery wireless network 110. For example, the lighting device 102, 104 may communicate with other devices through the password recovery device 106. To illustrate, another device that connects to the password recovery device 106 may include a user interface that allows changing or resetting the network password of the default wireless network 108.

After changing the network password of the default wireless network 108 using the recovery wireless network 110, the user may configure the lighting device 102 by connecting to the lighting device 102 over the default wireless network 108. Because the password of the default wireless network 108 is now known to the user, the user may use the system device 124 or another wireless device to change parameters of the lighting device 102 over the default wireless network 108. For example, the system device 124 may include an application/software with an interface to make changes to the operational configuration of the lighting device 102.

If, upon detection of the expected power cycle sequence, the lighting device 102 is unable to find the password recovery device 106, the lighting device 102 may connect to the lighting device 104 and/or other lighting devices on the wireless network 108. For example, the lighting device 102 may search for the password recovery device 106 for a preset time period (e.g., five minutes) before starting to search for and/or connect to the lighting device 104 and/or to other lighting devices on the wireless network 108.

Although some of the above description focuses on the lighting device 102, the description is equally applicable to the lighting device 104 and other lighting devices that may be part of the system 100. Although two lighting devices are shown in FIG. 1, the system 100 may include significantly more lighting devices that communicate with one or more of the lighting device 102, the lighting device 104, and other lighting devices using the default wireless network 108. Although the system 100 is described as having the lighting devices, in some embodiments, the system 100 may include devices other than lighting devices without departing from the scope of this disclosure.

Figure 2:
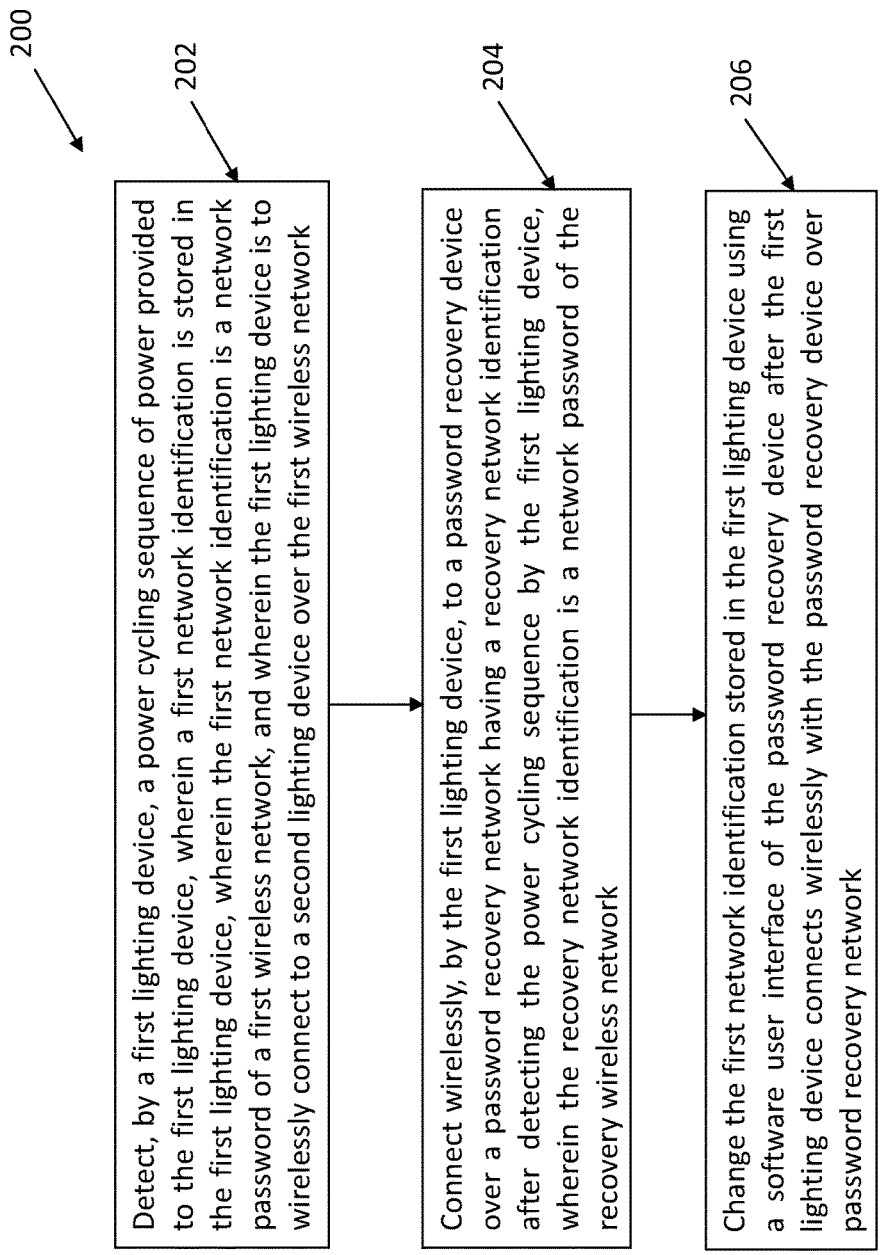
FIG. 2 illustrates a method for changing a password of a wireless network of lighting devices according to an example embodiment.

FIG. 2 illustrates a method 200 for changing a password of a wireless network of lighting devices according to an example embodiment. Referring to FIGS. 1 and 2, at step 202, the method 200 includes detecting, by the first lighting device 102, a power cycling sequence of power provided to the first lighting device 102. A first network identification (e.g., the default network identification) is stored in the first lighting device 102. The first network identification is a network password of the first wireless network (e.g., the default wireless network 108). The first lighting device 102 is to wirelessly connect to a second lighting device (e.g., the second lighting device 104) over the first wireless network 108.

At step 204, the method 204 includes connecting wirelessly, by the first lighting device, to the password recovery device 106 over the password recovery network 100, which has the recovery network identification, after the first lighting device detects the power cycling sequence. The recovery network identification is a network password of the recovery wireless network 110.

At step 206, the method 200 includes changing the first network identification stored in the first lighting device 102 using a software user interface of the password recovery device 106 after the first lighting device 102 connects wirelessly with the password recovery device 106 over password recovery network 110. For example, a user may use the software user interface of the password recovery device 106 to change the default network identification stored in the first lighting device 102.

In some example embodiments, the method 200 may also include, in response to detecting the power cycling sequence, the first lighting device 102 attempting to connect to the password recovery device 106 over the password recovery network 110 before attempting to connect to the second lighting device 104 over the first wireless network 108. The method 200 may also include connecting wirelessly, by the second lighting device 104, to the password recovery device 106 over the password recovery network 110 after the second lighting device 104 detects a power cycling sequence of power provided to the second lighting device 104. For example, the power cycling sequence may be the same for the lighting devices 102, 104, as well as other devices that can communicate over the default wireless network 108.

The method 200 may also include changing the first network identification stored in the second lighting device 104 using the software user interface of the password recovery device 106 after the second lighting device 104 connects wirelessly with the password recovery device 106 over password recovery network 110. For example, a user may use the software user interface of the password recovery device 106 to change the default network identification stored in the second lighting device 104. The method 200 may also include the first lighting device 102 wirelessly connecting to the second lighting device over the first wireless network 108 if the first lighting device 102 fails to detect the password recovery device 106 over the password recovery network 110 after searching for the password recovery device 106 in response to detecting the power cycling sequence. In some example embodiments, the lighting devices 102, 104 and other lighting devices could be power cycled together using a breaker that controls power delivery to the devices.

Although a particular order of steps of the method 200 are shown in FIG. 2, some steps may be performed in a different order than presented without departing from the scope of this disclosure. In some example embodiments, some steps of the method 200 may be skipped or otherwise omitted without departing from the scope of this disclosure. Although some of the above description focuses on the lighting device 102, the description is equally applicable to the lighting device 104 and other lighting devices that may be part of the system 100 of FIG. 1.

Figure 3:
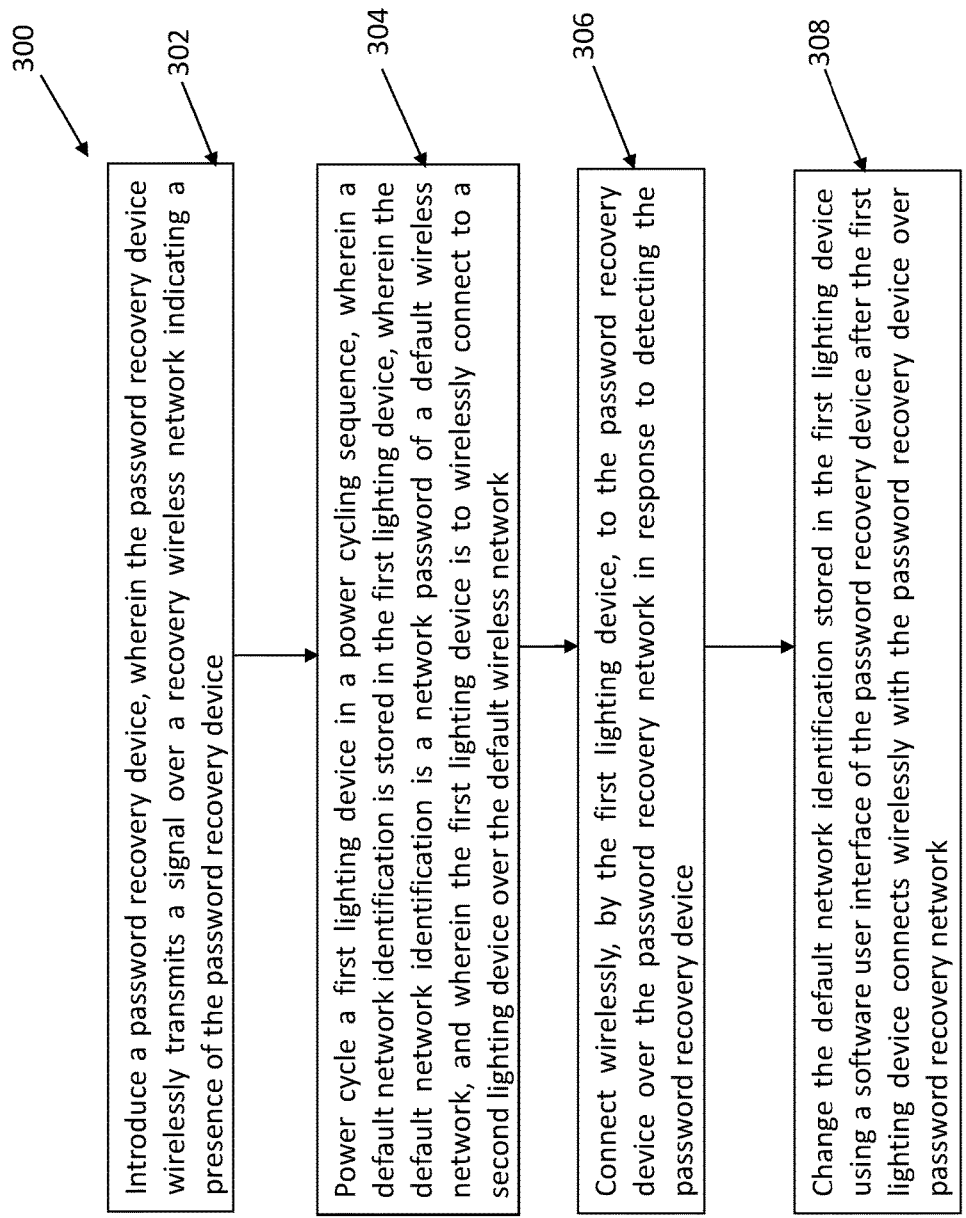
FIG. 3 illustrates a method for changing a password of a wireless network of lighting devices according to another example embodiment.

FIG. 3 illustrates a method 300 for changing a password of a wireless network of lighting devices according to another example embodiment. Referring to FIGS. 1 and 3, at step 302, the method 300 includes introducing a password recovery device 106 that can wirelessly transmit a signal over a recovery wireless network 110 indicating a presence of the password recovery device 110. For example, the password recovery device 106 may start wirelessly transmitting a beacon upon power up to enable detection by other wireless devices. At step 304, the method 300 includes power cycling the first lighting device 102 in a power cycling sequence. For example, the power cycling sequence may be three consecutive power down and power up sequences lasting a total of less than a few seconds (e.g., 30 seconds). The default network identification is stored in the first lighting device 102. The default network identification is a network password of the default wireless network 108. The first lighting device 102 can wirelessly connect to the second lighting device 104 or another lighting device over the default wireless network 102.

At step 306, the method 300 includes connecting wirelessly, by the first lighting device 102, to the password recovery device 106 over the password recovery network 110 in response to detecting the password recovery device by the first lighting device 102. At step 308, the method 300 includes changing the default network identification stored in the first lighting device 102 using a software user interface of the password recovery device 106 after the first lighting device 102 connects wirelessly with the password recovery device 106 over password recovery network 110. For example, a user may use a software user interface of the password recovery device 106 to change the default network identification stored in the first lighting device 102. The software user interface may be provided by a software/application resident on the password recovery device 106, which, for example, may be displayed on a screen of the password recovery device 106 or otherwise presented to a user to enter information.

In some example embodiments, the method 300 includes searching, by the first lighting device, for the password recovery device on the recovery wireless network in response to detecting the power cycling sequence. The method 300 may also include power cycling the second lighting device 104. The default network identification that is stored in the first lighting device 102 is stored in the second lighting device 104, and in other devices that can communicate over the default wireless network 108. The method 300 may further include connecting wirelessly, by the second lighting device 104, to the password recovery device 106 over the password recovery network 110 in response to detecting the password recovery device 110.

The method 300 may also include the first lighting devices 102 wirelessly connecting to the second lighting device 104 over the first wireless network if the first lighting device 102 fails to detect the password recovery device 106 over the password recovery network 110. In such cases, the default network identification that is stored in the lighting devices 102, 104 remains unchanged.

Because lighting devices may communicate over a default wireless network (e.g., a lighting system wireless network) that has a network password unknown to a user, the user may need to change the network password (i.e., the default network identification stored in the lighting devices 102, 104, and other devices) to be able to wirelessly configure the lighting devices. As described above, the user may be able to change the network password by connecting with the lighting devices using the password recovery device 106 over the password recovery network 110. After the network password of the default wireless network is changed (i.e., set, reset, etc.), the user may access the lighting devices over the default network and configure the devices as needed. In some cases, the user may desire to change the network password of the default network by changing the default network identification stored in the lighting devices 102, 104, and other devices for security reasons, such as if the existing network password compromised.

Although a particular order of steps of the method 300 are shown in FIG. 3, some steps may be performed in a different order than presented without departing from the scope of this disclosure. In some example embodiments, some steps of the method 200 may be skipped or otherwise omitted without departing from the scope of this disclosure. Although some of the above description focuses on the lighting device 102, the description is applicable to the lighting device 104 and other lighting devices that may be part of the system 100 of FIG. 1.

Although particular embodiments have been described herein, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A system for changing a network password, the system comprising:
    a first lighting device comprising a processor and one or more storage devices and configured to wirelessly connect to a second lighting device on a first wireless network having a first network identification, wherein the first network identification is a network password of the first wireless network; and
    a password recovery device, wherein, in response to detecting a power cycling sequence of power provided to the first lighting device, the first lighting device attempts to wirelessly connect to the password recovery device over a recovery wireless network having a recovery network identification before attempting to connect to the second lighting device over the first wireless network, wherein the recovery network identification is a network password of the recovery wireless network, and wherein the password recovery device includes a software user interface for changing the first network identification stored in the first lighting device.

2. The system of claim 1, wherein attempting to wirelessly connect to the password recovery device includes searching for the password recovery device on the recovery wireless network.

3. The system of claim 1, wherein the recovery network identification is stored in the first lighting device.

4. The system of claim 3 wherein the first network identification is stored in the second lighting device.

5. The system of claim 3, wherein the recovery network identification is stored in the second lighting device.

6. The system of claim 1, wherein the first lighting device connects to the second lighting device on the first wireless network in response to determining that the password recovery device is unavailable.

7. The system of claim 6, wherein the first lighting device determines that the password recovery device is unavailable after searching for the password recovery device for a preset time period.

8. The system of claim 1, wherein changing the first network identification stored in the first lighting device includes resetting the first network identification.

9. The system of claim 1, wherein the second lighting device is to wirelessly connect to the password recovery device over the recovery wireless network.

10. The system of claim 1, wherein the password recovery device is a mobile phone, a laptop, or a tablet.

11. The system of claim 1, wherein the first lighting device includes a switch, a dimmer, a timer, or a centralized lighting control device.

12. A method for changing a network password, the method comprising:
    detecting, by a first lighting device, a power cycling sequence of power provided to the first lighting device, wherein a first network identification is stored in the first lighting device, wherein the first network identification is a network password of a first wireless network, and wherein the first lighting device is configured to wirelessly connect to a second lighting device over the first wireless network;
    connecting wirelessly, by the first lighting device, to a password recovery device over a recovery wireless network having a recovery network identification after detecting the power cycling sequence by the first lighting device, wherein the recovery network identification is a network password of the recovery wireless network, wherein, in response to detecting the power cycling sequence, the first lighting device attempts to connect to the password recovery device over the recovery wireless network before attempting to connect to the second lighting device over the first wireless network; and
    changing the first network identification stored in the first lighting device using a software user interface of the password recovery device after the first lighting device connects wirelessly with the password recovery device over the recovery wireless network.

13. The method of claim 12, further comprising connecting wirelessly, by the second lighting device, to the password recovery device over the recovery wireless network after the second lighting device detects a second power cycling sequence of power provided to the second lighting device.

14. The method of claim 13, further comprising changing the first network identification stored in the second lighting device using the software user interface of the password recovery device after the second lighting device connects wirelessly with the password recovery device over recovery wireless network.

15. The method of claim 12, further comprising power cycling of the power provided to the first lighting device and power provided to the second lighting device using a breaker that controls power delivery to the first light device and to the second lighting device.

16. The method of claim 12, further comprising the first lighting device wirelessly connecting to the second lighting device over the first wireless network if the first lighting device fails to detect the password recovery device over the recovery wireless network.

17. The method of claim 12, wherein the first lighting device includes a switch, a dimmer, a timer, or a centralized lighting control device.

18. A method for changing a network password, the method comprising:
    introducing a password recovery device, wherein the password recovery device wirelessly transmits a signal over a recovery wireless network indicating a presence of the password recovery device;
    power cycling a first lighting device in a power cycling sequence, wherein a default network identification is stored in the first lighting device, wherein the default network identification is a network password of a default wireless network, and wherein the first lighting device is configured to wirelessly connect to a second lighting device over the default wireless network;

searching, by the first lighting device, for the password recovery device on the recovery wireless network in response to detecting the power cycling sequence;

connecting wirelessly, by the first lighting device, to the password recovery device over the recovery wireless network in response to detecting the password recovery device; and changing the default network identification stored in the first lighting device using a software user interface of the password recovery device after the first lighting device connects wirelessly with the password recovery device over the recovery wireless network.

19. The method of claim 18, further comprising:

power cycling the second lighting device, wherein the default network identification is stored in the second lighting device; and connecting wirelessly, by the second lighting device, to the password recovery device over the recovery wireless network in response to detecting the password recovery device.

20. The method of claim 18, further comprising the first lighting device wirelessly connecting to the second lighting device over the default wireless network if the first lighting device fails to detect the password recovery device over the recovery wireless network.

* * * * *